June 12, 1951 R. BRYNGELSON 2,556,518
DEVICE FOR AIDING IN CHART MAKING
Filed April 30, 1947 2 Sheets-Sheet 1

Inventor
Ross Bryngelson
By H. B. Willson & Co.
Attorney

June 12, 1951     R. BRYNGELSON     2,556,518
DEVICE FOR AIDING IN CHART MAKING
Filed April 30, 1947     2 Sheets-Sheet 2
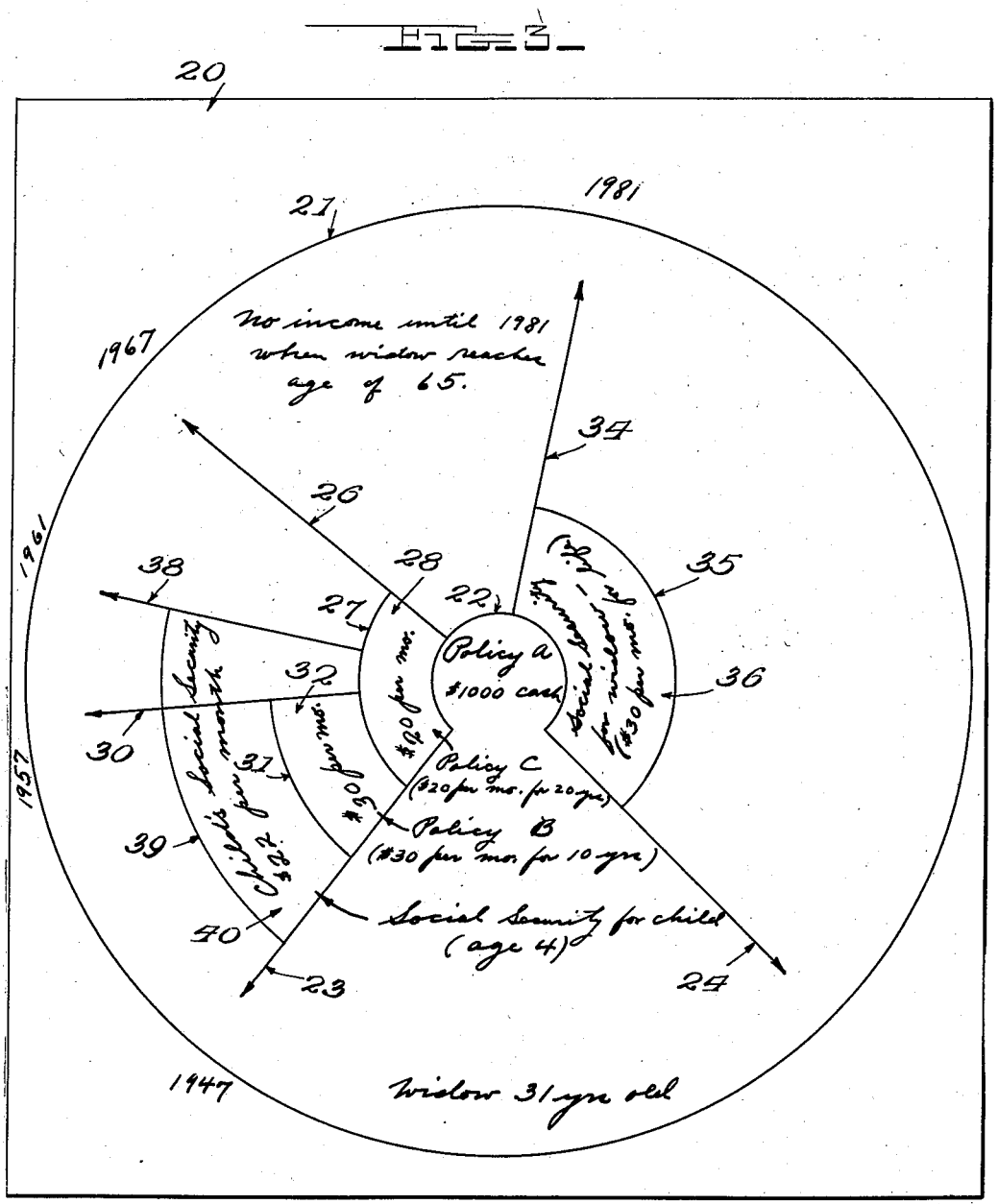
Inventor
Ross Bryngelson Patented June 12, 1951

2,556,518

UNITED STATES PATENT OFFICE 2,556,518

DEVICE FOR AIDING IN CHART MAKING

Ross Bryngelson, Omaha, Nebr.

Application April 30, 1947, Serial No. 744,881

6 Claims. (Cl. 33—26)

1

The invention aims to provide a novel and advantageous article for aiding an insurance salesman in quickly and easily preparing a chart, for the purpose of graphically showing a prospective customer just what protection is afforded by any life insurance policies which he may already have, and/or the protection which would be provided by any policies which the salesman may be advocating, and also any Social Security benefits which may be later relied upon.

Figure 1 of the accompanying drawings is a face view of the invention.

Fig. 3 is a face view showing one example of a chart prepared with the aid of the invention.

Figure 1:
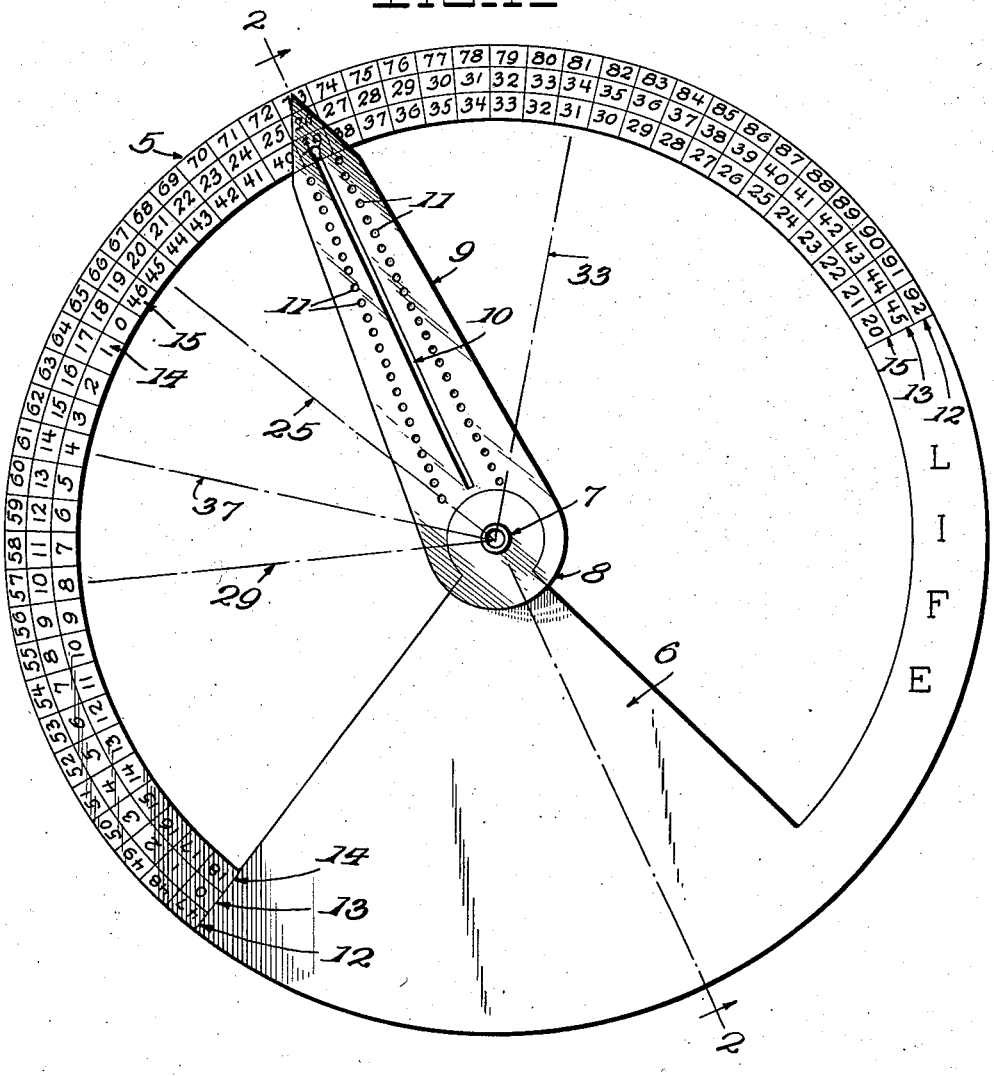
Figure 2:
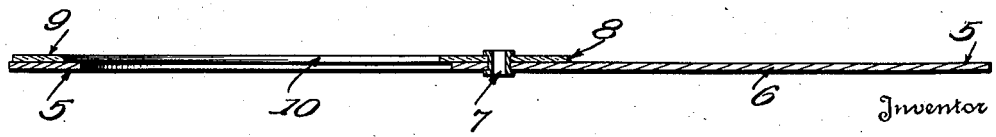
Fig. 2 is a sectional view on line 2—2 of Fig. 1.

The drawings illustrate the preferred form of the invention and while that form will be rather specifically described, it is to be understood that minor variations may be made.

A flat ring 5 is provided, said ring being formed from a plastic or other suitable material and being sufficiently stiff to lie flat upon a sheet of paper without warping or curling. This ring 5 is provided with an equally stiff, internal, segmental or sector-shaped projection 6, the inner end of which carries a pivot 7 which is concentric with said ring; and upon this pivot, the arcuate inner end 8 of a flat, radial, transparent pointer 9 is mounted, the outer end of said pointer being disposed upon the ring 5 for coaction with certain numerical scales later described. The pointer 9 is sufficiently stiff to retain its shape, and said pointer is provided with a central longitudinal slot 10 disposed radially of the ring 5, and with two rows of openings 11 at opposite sides of said slot and spaced different distances from the pivot 7. The slot 10 is of a width to receive the point of a pencil to guide the latter in drawing radial lines, and the openings 11 are of a diameter to receive the pencil point to so position the latter that arcs can be drawn by moving the pencil to swing the pointer 9. While the pivot 7 is shown as a tubular rivet, it may be any form of a pivot pin which will hold the inner end of the pointer in frictional contact with the enlargement at the inner end of the projection 6. The outer end of the transparent pointer is V-shaped and terminates within the outer edge of the circular ring 5.

Upon the ring 5, I provide a plurality of numerical scales all concentric with said ring. The outer scale 12 is a year scale which contains a first number representing the current year during which the article is to be used, and other numbers representing succeeding future years. These

2 numbers increase clockwise from 47 to 92 in the present disclosure and represent the years 1947 to 1992, but in a device for use in 1948, the first number would be 48, and for 1949 the first number would be 49 and so on, with the following numbers correspondingly changed.

The intermediate scale 13 contains numbers which are alined, radially of the ring 5, with those of the year scale 12, and said numbers increase clockwise from 0 (zero) to 45. These numbers of the scale 13 represent the span or period of years from the first year number (47) of scale 12 to any particular year number of said scale 12. For example, it will be seen that the number 20 of scale 13 is under the number 67 of scale 12, and it can thus be readily seen that a twenty-year period starting in 1947 would expire in 1967. The year of expiration of a 40-year period starting in 1947 would be determined by locating the number 40 on scale 13 and reading the number directly above it on scale 12, which number is 87, meaning the year 1987. In view of this function of scale 13 to determine when various periods of time expire, said scale 13 may well be termed a period-termination-scale.

Two inner scales 14 and 15 are provided. The scale 14 represents the ages of minor children from 1 year to 18 years and may, therefore, be termed a minor-age-scale. The numbers 1 to 18 of this scale 14 are radially alined with those of the scales 12 and 13 and they increase counter-clockwise, the first number (1) being below the number 17 of scale 13 and the last number (18) directly below the 0 (zero) of said scale 13. Scale 14 is used in determining the period of years during which any child (up to and including age 18) would draw monthly Social Security benefits, which period would end at the age of 18 years, the determination being based upon the assumption that the death requiring the Social Security payments would occur in the year represented by the first number of the year scale 12 (1947 in the present disclosure). For example, a child 6 years old in 1947 would be entitled to benefits for 12 years and they would expire in 1959. All of this information is given by simply locating the number 6, corresponding to the child's age, in the scale 14, and reading the numbers over this located age number. The pertinent number in scale 13 would be 12 showing that the benefits would terminate at the end of a period of 12 years, and the pertinent number in scale 12 would be 59, showing that the benefits would cease in the year 1959.

The scale 15 is an adult age scale. The numbers of this scale 15 are radially alined with those of the scales 12 and 13 and they increase counterclockwise from 20 to 46, in the present disclosure, the first number (20) of said scale 15 being under the number 45 of scale 13. This scale 15 is used in determining the number of years before and the year in which any person, from 20 to 46 years of age, will reach the age of 65, at which age Social Security payments will start if the person be qualified. Assume, for example, that a widow is 22 years old and we wish to determine in how many years and in what year she will reach the age of 65. We would simply locate the number in scale 15 corresponding to her age (22) and read the numbers of scales 12 and 13 above said located age number 22. The number 43 in scale 13 shows that at the expiration of a 43 year period, she will reach the age of 65, and the number 90 in scale 12 shows that she will reach that age in the year 1990.

Information which may be obtained as above explained from the scales 12, 13, 14 and 15, is useable by an insurance salesman in preparing a chart; and certain straight and curved lines to be embodied in this chart are to be drawn by him with the aid of the device above described; and the completed chart is of advantage to the salesman in endeavoring to sell more insurance to a "prospect," all of which will be clear from the following, giving instructions for preparing the chart shown in Fig. 3, which figure illustrates only a simple example of the many charts which may be made with the aid of the invention.

We will assume that the insurance salesman is endeavoring to convince a "prospect" of the advisability of purchasing more life insurance than he is now carrying. Assume, also, that the "prospect" is a husband, that his wife is 31 years old, and that they have a 4 year old child. Assume further, that the "prospect" informs the salesman that he already has Policy A for $1000.00 payable at death, Policy B payable $30.00 per month for 10 years, and Policy C payable $20.00 per month for 20 years; and that these policies, plus the Social Security benefits for his widow and child should be sufficient. The salesman then proceeds to prepare a chart (see Fig. 3) to show the "prospect," on one piece of paper, just how his policies A, B and C and the Social Security benefits would provide for his widow and child, should he die during the current year (1947). To prepare this chart, the salesman holds the device of Fig. 1 upon a sheet of paper, denoted at 20 in Fig. 3. He then draws a pencil circle 21 around the ring 5 (or along the inner edge of said ring), draws an arc 22 around the curved inner end 8 of the pointer 9, and draws two radial lines 23 and 24 along the radial edges of the segmental or sector-shaped projection 6. He then considers policy C, for example, ($20.00 per month for a period of 20 years) and swings the pointers 9 to the number 20 of the period-termination-scale 13, which number indicates the end of said 20-year period. At the same time, the number of the year scale 12 above said number 20 indicates that said 20-year period ends in 1967. With the pointer in this position, indicated by the line 25 of Fig. 1, the salesman then draws a radial line 26 within slot 10 to the arc 22. He also writes "1967" on the sheet 20 at the outer end of the line 26. Then, placing his pencil point in one of the openings 11, he swings the pointer 9 counterclockwise and draws the arc 27 from the line 26 to the line 23, thus forming an arcuate box 28 in which he writes such a notation as "$20.00 per month." The salesman then considers Policy B ($30.00 per month for a period of 10 years) and swings the pointer 9 to the position 29 of Fig. 1, in which position said pointer is alined with the number 10 of scale 13 (denoting the end of the 10-year period) and with 57 on scale 12 (denoting that said period ends in 1957). He then proceeds, with the aid of the pointer, to draw the lines 30 and 31, thereby providing another box 32 in which he writes such a notation as "$30.00 per month," and at the outer end of said line 30 he writes "1957" upon the sheet 20. The year in which the "widow" will become 65 years of age and after which she will receive her Social Security benefits, may now be determined. It will be recalled that she is 31 years old. Therefore, the pointer 9 is swung to the position 33 of Fig. 1, in which position it is alined with 31 on the adult age scale 15. In this position, the number 34 on the period-termination-scale 13 shows that in 34 years the "widow" will be 65 years old and the number 81 of the year scale 12 shows that she will reach that age in 1981. The salesman then draws the lines 34 and 35 to form a box 36 in which he writes such a notation as "Social Security for widow—($30.00 per month for life)," and he writes "1981" on the sheet 20 at the outer end of the line 34. The four-year old child's Social Security benefits may now be charted. In doing so, the pointer 9 is swung to the position 37 of Fig. 1, in which position, the number 4 of the minor-age scale 14 is the child's age, the number 14 of the period-termination-scale 13 shows that he will be 18 at the end of a 14-year period, and the number 61 of the year scale 12 shows that his period of Social Security benefits will end in 1961 (at the age of 18). Then, with the aid of the pointer 9, the salesman draws the lines 38 and 39, forming a box 40 in which he writes such a notation as "Child's Social Security—$22 per month." He also writes "1961" at the outer end of the line 38. Any other benefits which would be available to mother or child, may be charted also in ways which will be clear from the foregoing. The entire device of Fig. 1 is then removed from the sheet 20 and a note is made, preferably within the arcuate line 22, with regard to the cash-on-death-policy A for $1000.00. Notations are also made between the lines 23 and 24 to identify the box 28 with policy C, the box 32 with policy B, and the box 40 with the child's Social Security. Also, the "widow's" age may be written on the chart.

The above operations, while requiring a rather lengthy description, may be performed by the salesman in a few minutes and he then has a complete chart (Fig. 3) to show the "prospect" just what protection his family would receive if he should die during the current year. From this chart, it can be readily seen that the "widow" would receive $1000.00 cash from policy A, upon the death of her husband; from 1947 to 1967 she would receive $20.00 per month from policy C; from 1947 to 1957, she would receive $30.00 additional per month on policy B; from 1981 to death she would receive $30.00 Social Security per month; and from 1947 to 1961, the child would receive $22.00 per month. The chart, however, also shows an uncovered period from 1967 to 1981 during which the widow would receive no payments of any kind. This fact graphically brought to the attention of the "prospect"

is very convincing evidence that he should have additional insurance to fill the existing gap.

From the foregoing, it will be seen that the device illustrated will well attain the object sought, but attention is again invited to the possibility of making minor variations within the scope of the invention as claimed.

I claim:

1. A device to aid in drawing a chart, comprising a flat, circular ring to lie upon a sheet of paper and useable as a guide in drawing a circular line, said ring having an inwardly extending sector-shape projection provided with outwardly diverging scribing edges disposed radially of said ring for use in drawing two lines radial to said circular line, a pivot pin carried by said projection and located concentrically with respect to said ring, a flat, elongated pointer disposed above and resting on said ring, said pointer having its inner end mounted on said pivot pin, the outer end of said pointer terminating within the outer edge of said ring, said pointer having a straight pencil-point-receiving slot disposed radially with respect to said ring for use in drawing other lines radial to said circular line, said pointer also having openings spaced apart longitudinally thereof to receive a pencil point, permitting the drawing of arcs by swinging said pointer, said pointer also having its inner end of semi-circular shape for use as a guide in drawing an arc between the inner ends of said two radial lines, and scale means on said ring for determining various positions to be occupied by said pointer when drawing said radial lines along the slot of said pointer.

2. A structure as specified in claim 1; said scale means including a year scale concentric with said ring and comprising year numbers increasing clockwise and representing the current year and succeeding future years; said scale means also including a period-termination-scale comprising numbers increasing clockwise and radially alined with those of said year scale and denoting the period of time from the current year number of said year scale to any of the future year numbers of said year scale; said scale means also including an age scale having age-representing numbers radially alined with the numbers of the aforesaid scales.

3. A structure as specified in claim 1; said scale means including a year scale concentric with said ring and comprising year numbers increasing clockwise and representing the current year and succeeding future years; said scale means also including a period-termination-scale comprising numbers increasing clockwise and radially alined with those of said year scale and denoting the period of time from the current year number of said year scale to any of the future year numbers of said year scale; said scale means also including an adult age scale having age-representing numbers radially alined with numbers of the aforesaid scales, the age-representing numbers of said adult age scale being so related with numbers of said year and period-termination scales that any selected age number of said adult age scale plus the radially alined number of said period-termination-scale will equal 65, and the radially alined number of said year scale will show the year in which a person having the age represented by said selected age number will reach the age of 65.

4. A structure as specified in claim 1; said scale means including a year scale concentric with said ring and comprising year numbers increasing clockwise and representing the current year and succeeding future years; said scale means also including a period-termination-scale comprising numbers increasing clockwise and radially alined with those of said year scale and denoting the period of time from the current year number of said year scale to any of the future year numbers of said year scale; said scale means also including a minor age scale having age-representing numbers increased counter-clockwise and radially alined with numbers of the aforesaid scales, said age-representing numbers of said minor age scale ranging from 1 to 18 with the latter radially alined with said current year number of said year scale, whereby the number of said period-termination-scale radially alined with any selected age number of said minor age scale will show the number of years in which a minor whose age is represented by said selected number will reach the age of 18, and whereby the year number of said year scale radially alined with said selected age number will show the year in which the minor will reach said age of 18.

5. A structure as specified in claim 1; said scale means including a year scale concentric with said ring and comprising year numbers increasing clockwise and representing the current year and succeeding future years; said scale means also including a period-termination-scale comprising numbers increasing clockwise and radially alined with those of said year scale and denoting the period of time from the current year number of said year scale to any of the future year numbers of said year scale; said scale means also including a minor age scale and an adult age scale both having age-representing numbers radially alined with numbers of the aforesaid scales, the numbers of both of said age scales being increased counter-clockwise, the age-representing numbers of said minor age scale ranging from 1 to 18 with the latter radially alined with said current year number of said year scale, whereby the number of said period-termination-scale radially alined with any selected age number of said minor age scale will show the number of years in which a minor whose age is represented by said selected number will reach the age of 18, and whereby the year number of said year scale radially alined with said selected age number will show the year in which the minor will reach said age of 18; the age-representing numbers of said adult age scale being so related with numbers of said year and period-termination-scales that any selected age number of said adult age scale plus the radially alined number of said period-termination-scale will equal 65, and the radially alined number of said year scale will show the year in which a person having the age represented by said selected age number will reach the age of 65.

6. A device to aid in drawing a chart, comprising a flat, circular ring to lie upon a sheet of paper and having a continuous circular scribing edge usable as a guide in drawing a circular line, said ring having an integral, V-shaped inward projection provided with outwardly diverging scribing edges disposed radially of said ring for use in drawing two inwardly converging lines radial to said circular line, said projection having at its inner end an arcuate enlargement surrounding the axis of said ring, a pivot pin carried by said enlargement and located concentrically with respect to said ring, a flat, elongated pointer having its inner end mounted on said pivot pin and held in frictional contact with said enlargement, the inner end of said pointer being of semi-circular shape and of greater area than said enlargement, said semi-circular shaped inner end being usable as a scribing edge in drawing an inner circular line connecting the inner ends of said converging radial lines, the outer end of said pointer being transparent and terminating within the outer edge of said ring, said outer end of said pointer being held in frictional contact with said ring by the pivotal connection of the inner end of said pointer, said pointer having a straight, pencil-point-receiving slot disposed radially with respect to said ring for use in drawing other lines radial to said circular lines, said pointer also having pencil-point-receiving openings spaced apart longitudinally thereof to permit the drawing of arcs by swinging said pointer, and scale means on said ring for determining various positions to be occupied by said pointer when drawing said radial lines along the slot of said pointer, said scale means extending circumferentially of said ring starting at the outer portion of one side of said V-shaped projection.

ROSS BRYNGELSON.

REFERENCES CITED

The following references are of record in the file of this patent:

UNITED STATES PATENTS

| Number | Name | Date |
|---|---|---|
| 918,947 | Boljahn | Apr. 20, 1909 |
| 1,237,721 | Stanley | Aug. 21, 1917 |
| 1,492,811 | Rothschild | May 6, 1924 |
| 1,665,898 | Strickland | Apr. 10, 1928 |
| 2,054,420 | Hochman | Sept. 15, 1936 |
| 2,070,675 | Niemeyer | Feb. 16, 1937 |